United States Patent [19]

Amicel

[11] 4,327,381
[45] Apr. 27, 1982

[54] BLANK JUMPING TELEPRINTING METHOD AND APPARATUS

[76] Inventor: Jean-Claude Amicel, 5, rue Jeanne d'Arc, 22300 Lannion, France

[21] Appl. No.: 156,108

[22] Filed: Jun. 3, 1980

[30] Foreign Application Priority Data

Jun. 19, 1979 [FR] France .................. 79 15681

[51] Int. Cl.³ ............................................. H04N 1/40
[52] U.S. Cl. .................................. 358/288; 358/260; 358/261
[58] Field of Search .................. 358/288, 260, 261

[56] References Cited

U.S. PATENT DOCUMENTS

| | | | |
|---|---|---|---|
| 3,643,016 | 2/1972 | Dattilo | 358/288 |
| 3,950,609 | 4/1976 | Tanaka | 358/260 |
| 4,058,674 | 11/1977 | Komura | 358/260 |
| 4,092,676 | 5/1978 | Saran | 358/261 |

*Primary Examiner*—Howard Britton
*Attorney, Agent, or Firm*—Lane, Aitken, Kice & Kananen

[57] ABSTRACT

Blank jumping teleprinting method in which a document is read line by line, each line being read point by point, each reading signal corresponding to each point is stored and groups of P signals are transmitted by multiplexing to a point by point writing means organized in groups of P points and in which the white areas of a line are detected, the signals corresponding to these blank areas being jumped during transmission, wherein a line is read once and in a memory with P cells are stored the reading signals belonging to a first group of P consecutive signals containing at least one non-zero signal, then the P cells of the memory are linked with the group of P points of the writing means corresponding to said first group and these operations are repeated for a first line for the same number of times as the latter gives groups of P reading signals incorporating at least one non-zero signal, while passing from one group of P signals to the next on each new reading of the same line until the line is at an end.

The invention also relates to the blank jumping teleprinter for performing the aforementioned method.

5 Claims, 14 Drawing Figures

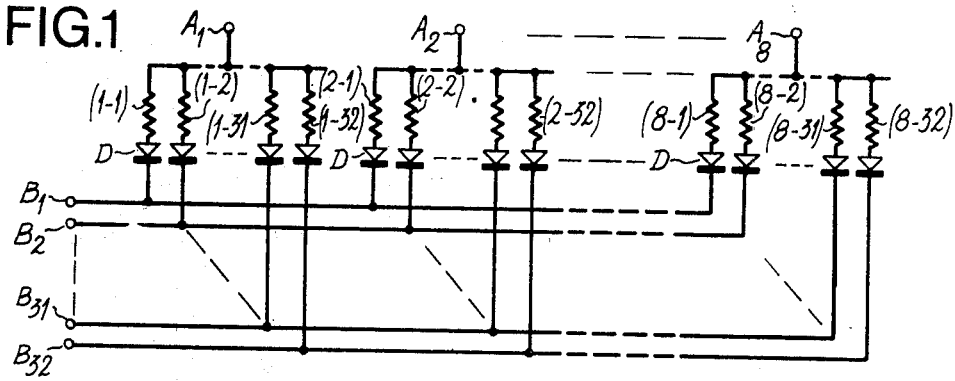
FIG.1
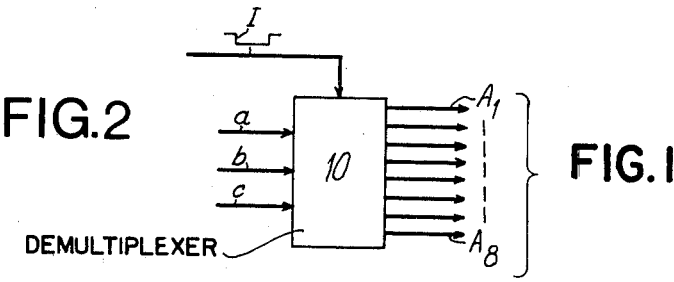
FIG.2
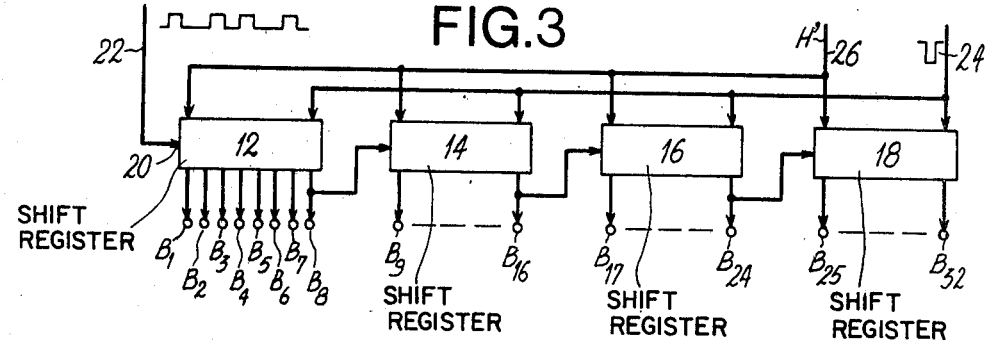
FIG.3
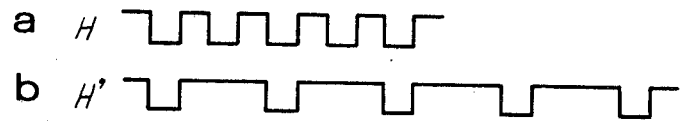
FIG.4
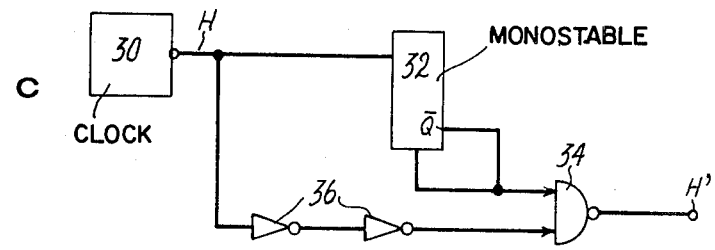

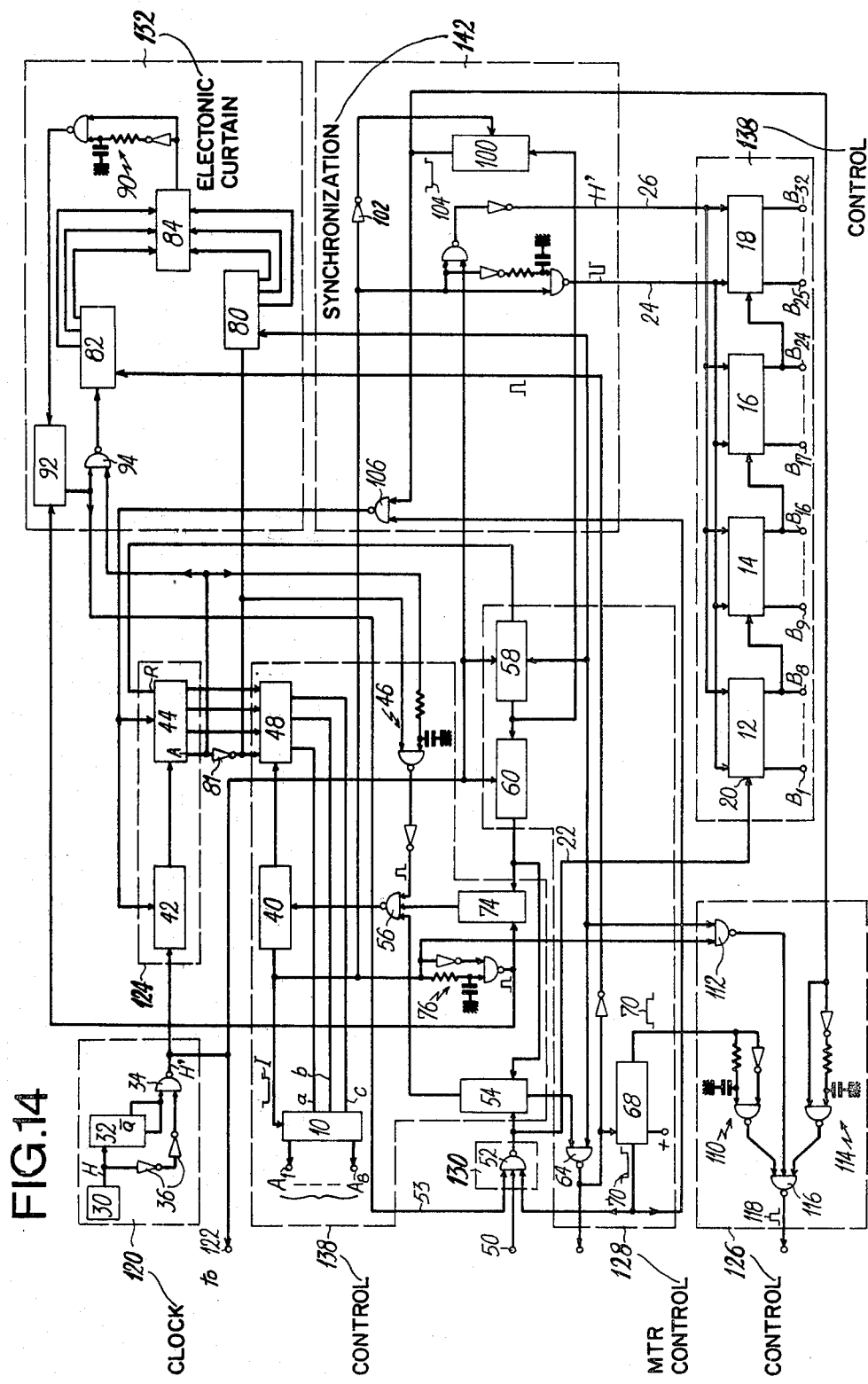

BLANK JUMPING TELEPRINTING METHOD AND APPARATUS

BACKGROUND OF THE INVENTION

The present invention relates to a blank jumping teleprinting method and apparatus applicable in the reproduction and transmission of written data.

Teleprinters essentially comprise two parts, one being used for analysing the document to be transmitted and the other being used for the regeneration thereof. In modern teleprinters, the components used for analysis or regeneration are of the integrated type. They are constituted by a certain number of elements which can read or write in point by point manner a particular document. The number of points constituting these components varies from 4 to 8 per millimeter, depending on the fineness of reproduction required. For the purpose of analysing and reproducing a standard A4 format in general 1728 points are used in the widthwise direction, corresponding to 8 points/mm. In the heightwise direction, the resolution is given by the forward movement of the document, the latter being analysed and reproduced line by line. For a standard resolution, 3.85 lines are transmitted per minute and this is 7.7 lines/minute for high resolution, corresponding to 2 million points in the first case and 4 million in the second.

The capacity of the modulator/demodulator circuits used for transmission are 1400 or 4800 bits/second or 9600 bits/second for special networks. Thus, 416 seconds or approximately 7 minutes are required for transmitting A4 format on a 4800 bit/second network in the standard mode.

To obtain transmission times of approximately 1 minute, it is necessary to compress the data so as to reduce the number of bits to be transmitted. For this purpose, it is possible to code the information in an appropriate language lending itself to compression and a certain number of codes have been developed for this purpose. Another solution which can be combined with the previous solution consists of jumping or skipping those areas in the document which are blank. Thus, a typed or manuscript message generally has many more blanks than black points, particularly the area between the lines, the spaces reserved for titles, the blanks left at the end of lines, etc. There can even be completely blank lines. In order to reduce the amount of information to be transmitted and consequently increase the speed of reproduction, it is of interest to jump all these blank areas.

Blank jumping teleprinter systems have already been proposed. A system of this type is for example described in French patent application No. EN 77 32802 (publication No. 2,369,760) filed on Oct. 28, 1977 and entitled "facsimile compression method and apparatus." Such systems use a strip of 1728 photodetector elements and a memory with the same number of cells. The document is read line by line, each line being read only once. The 1728 binary signals resulting from reading a line are immediately recorded in the memory. This memory is then read to constitute the signals to be transmitted and is carried out in groups of 32 cells. Before transmitting, the 32 bits contained in one of these groups, it is ensured that it contains at least one non-zero bit. If a particular group consists of all zero bits, it is not transmitted and it is then possible to jump to the following group. A jump signal is then produced to control the restoring means on the basis thereof.

This system has the obvious disadvantage of requiring a very large capacity memory because it is necessary to have the same number of memory cells as points analysed in a line.

BRIEF SUMMARY OF THE INVENTION

The present invention obviates this disadvantage because it uses a memory with a much smaller capacity, whilst maintaining the principle of jumping white areas.

To this end, according to the invention, each line is analysed by groups of points (for example one line of 256 points can be divided into 8 groups of 32 points). The same line is then scanned a number of times in succession, whilst retaining the 32 first points during the first scan, the 32 following points in the second scan and so on. For each group of points, it is established whether at least one point is black or in other words whether the 32 bits of the reading signal contains at least one non-zero bit. If this is the case, the bits of the group are stored in a memory which contains the same number of cells as a group contains points (i.e. 32 in the present example) and no more as is the case in the prior art where the number corresponds with the number of points in the line (256 in the example referred to). The stored bits are then transmitted in a conventional manner. If this is not the case, i.e. if a group of points contains no black point, the all zero binary signals corresponding to this group are not stored and are therefore skipped. (In the prior art, the signals corresponding to the group of 32 blank points were still memorised and were only skipped after reading the memory).

In the system according to the invention and for an analysis system with N points, the same line can therefore be scanned N/P times if P is the number of points constituting a group. (In the present example, N=256, P=32 and N/P=8). However, if a line is totally blank, it is only read once, because all the groups of 32 bits are jumped one after the other before the memory system is involved.

Thus, the invention makes it possible to simultaneously increase the speed of transmission and reduce the complexity of the means used.

More specifically, the present invention relates to a blank jumping teleprinting method in which a document is read line by line, each line being read point by point, each reading signal corresponding to each point is stored and groups of P signals are transmitted by multiplexing to a point by point writing means organised in groups of P points and in which the white areas of a line are detected, the signals corresponding to these blank areas being jumped during transmission, wherein a line is read once and in a memory with P cells are stored the reading signals belonging to a first group of P consecutive signals containing at least one non-zero signal, then the P cells of the memory are linked with the group of P points of the writing means corresponding to said first group and these operations are repeated for a first line for the same number of times as the latter gives groups of P reading signals incorporating at least one non-zero signal, whilst passing from one group of P signals to the next on each new reading of the same line until the line is at an end.

The present invention also relates to a blank jumping teleprinter utilizing the method defined hereinbefore and which comprises a means for reading a document line by line, each line being read point by point, a memory connected to said reading means, a circuit for transmitting the stored signals by multiplexing, means for detecting the white areas and for jumping them and a point by point writing means controlled by the signals transmitted and organised in N groups of P points, wherein said teleprinter comprises a memory with P cells connected to the reading means and successively receiving the P reading signals belonging to groups of P consecutive signals containing at least one non-zero signal, a demultiplexer making it possible to address the content of the P cells of the memory to the group of the writing means corresponding to the group of read points, a means for controlling the reading of one and the same lines the same number of times as the reading means supplies groups of P reading signals incorporating at least one non-zero signal and an electronic curtain placed between the reading means and the memory and permitting the passage of a first group of P reading signals to the memory during a first reading of the line when said group contains at least one non-zero signal, then of the following group during the second reading, etc. and finally the P last signals during a final reading.

BRIEF DESCRIPTION OF THE DRAWINGS

The invention is described in greater detail hereinafter relative to non-limitative embodiments with reference to the attached drawings, wherein show:

FIG. 1 diagrammatically a system of connections for a restoration component according to the prior art.

FIG. 2 diagrammatically a demultiplexer controlling the restoration component.

FIG. 3 diagrammatically a memory which can be used for the invention.

FIG. 4 a circuit diagram relative to the formation of control signals from timing signals.

FIG. 14 a diagram assembling the different partial circuits illustrated in FIGS. 2, 3, 5, 8, 10 and 12.

DETAILED DESCRIPTION OF THE PREFERRED EMBODIMENTS

Figure 5:
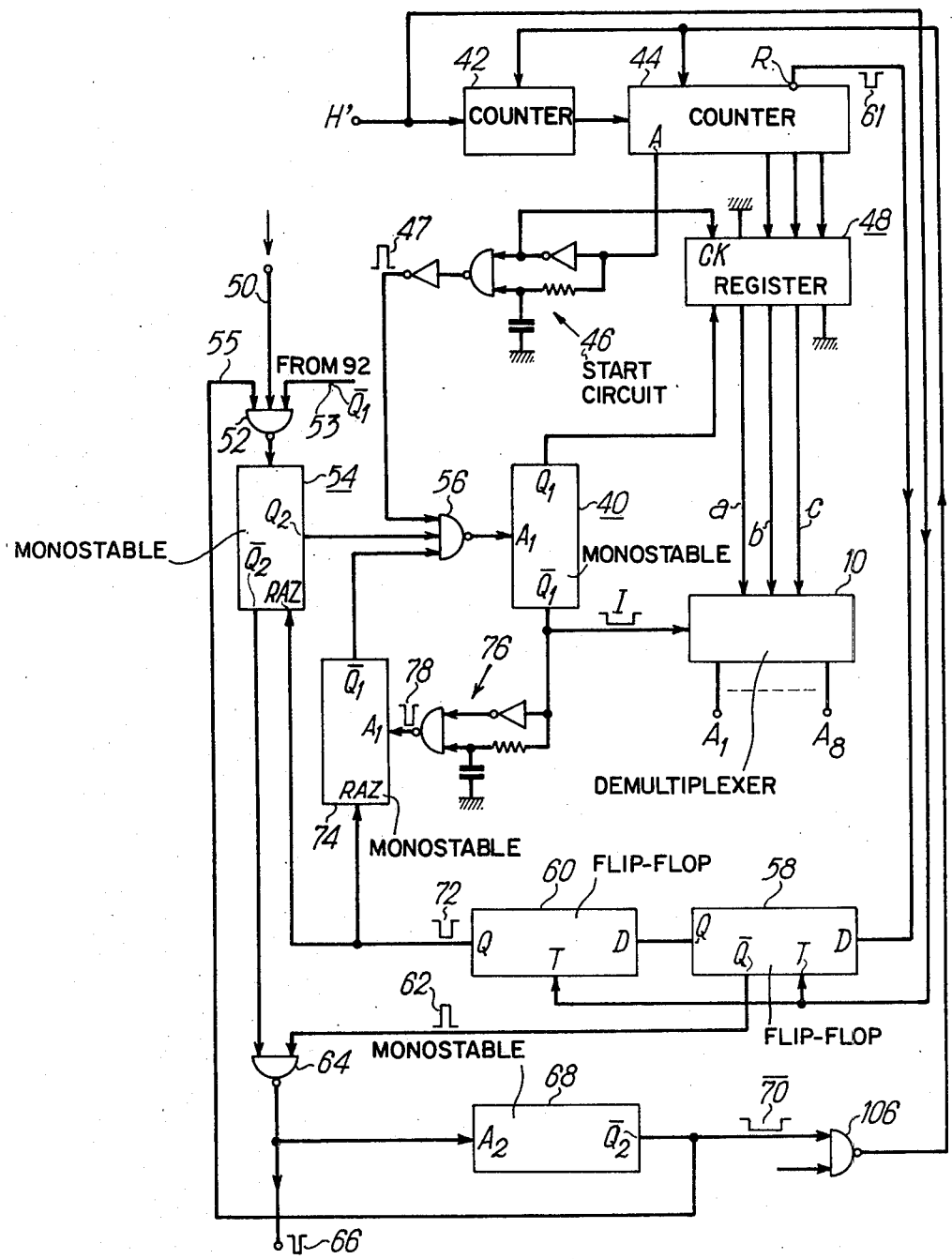
FIG. 5 a circuit for the formation of control signals for the regeneration and forward movement of a stepping motor.

The realisation of the invention requires means which will not be described in detail because they are known in the art. They consist more particularly of the analysis component, the component for restoring the stepping motor permitting the movement of the original document and its copy, etc. It is merely pointed out that the component used for the analysis of a page is a row of photodiodes integrated on the same silicon pellet. These photodiodes form rows of 128, 256, 512, 1024, or 1728 points with a jump of 25 microns up to 512 points and 12 microns for the others, leading to an approximately 2 cm long component for a strip of 1728 points. In order to use the same, an optical system is necessary which projects the image of the line to be analysed onto the photodiodes.

Each photodiodes receives the light reflected by the document with an intensity which is proportional to the reflection coefficient of the paper. This coefficient is not the same if the paper is blank of white or if it is blackened by ink. These photodiodes are connected to a shift register, which has the same number of cells as the strip has elements. This register regenerates in series the signal supplied by the photodiodes. In general, the photodiodes and the shift register are integrated onto the same semiconductor pellet.

For the operation of the analysis component, it is sufficient to apply thereto a timing signal of level TTL (Transistor-Transistor-Logic) and a starting signal for controlling the register once a line has been read.

Such a component is able to operate at high timing pulses rates which can be up to several megahertz, i.e. at a speed much higher than that of the modulator/demodulator and that of the regeneration component. For this reason, it is necessary to use a buffer store between the reading component and the transmission means.

The regeneration component is in the form of a line of punction elements, whose length is equal to the width of the document to be read. This means can be a thermal reproduction system associated with a special paper which changes color after the action of temperature, as from a threshold generally around 85° C.

Each element of the writing head can be constituted by a small heating resistor obtained by depositing-nickel-chrome on a substrate for example by a cathodic spattering method.

In order to write a line of points, the line of resistors is applied to the paper and certain of these resistors is heated to an adequate temperature by a suitable current flow. If the resistors are separated by 250 microns, it is possible to reproduce a document with a definition of 4 points/mm.

Throughout the remaining description and for explanatory purposes, it is assumed that the reading head incorporates two 256 photodiodes and that the writing means also has 256 points distributed into 8 groups of 32 points each. The electrical connections of the regeneration head are distributed in the manner shown in FIG. 1, in which resistors $(1-1), (1-2) \ldots (1-32)$ constitute a first group, resistors $(2-1), (2-2) \ldots (2-32)$ a second group, etc and resistors $(8-1), (8-2) \ldots (8-32)$ constitute an 8th and final group.

Each resistor has two electrical connections and all the connections of the regeneration means are organised in the following way. The elements belonging to the same group of 32 elements have a common electrode, so that there are 8 common terminals $A_1, A_2 \ldots A_8$. The connections corresponding to these elements occupying a same position in the different groups are interconnected, so that there are 32 terminals $B_1, B_2 \ldots B_{32}$.

Such a per se known arrangement makes it possible to reduce the number of connections from $8 \times 32 = 256$ to $8 + 32 = 40$ (and more generally from NP to N+P). However, it requires a multiplexed control consisting of successively applying to the terminals $A_1, A_2 \ldots A_8$ control pulses and for the whole duration of one of these pulses 32 writing signals to the 32 terminals $B_1$ to $B_{32}$. This arrangement also requires that diodes D be arranged in series with each resistor in order to prevent the currents being relooped by non-excited resistors.

In order to print paper, it is necessary to apply thereto a sufficient thermal energy by means of the said resistors. It is possible, for example, to pass to it a current of 40 mA for a time of a ms, which requires a time of 32 ms (8×4 ms) in order to completely reproduce a line.

Thus, the problem of controlling the regeneration component involves forming a pulse lasting 4 ms, switching this pulse to one of the connections $A_1, A_2 \ldots A_8$ and, during the application of said pulse, applying to connections $B_1$ to $B_{32}$ signals 0 or 1 which control the writing of black or blank points facing the elements of the group in question. The means which will now be described are able to fulfil these functions.

The circuit of FIG. 2 makes it possible to switch a control pulse I to one or other of the 8 connections $A_1$ to $A_8$. It is a demultiplexer 10 with 8 outputs and three control inputs a, b, c. Binary signals equal to 0 or 1 are applied to the inputs a, b, c to define which of the 8 outputs $A_1$–$A_8$ will take the pulse I.

The circuit of FIG. 3 is a memory in the form of a shift register with 32 cells obtained by associating four circuits 12, 14, 16 and 18 with 8 cells each. The memory has an input 20 to which are applied the signals from the reading component by an input connection 22 and 32 outputs connected to the 32 terminals $B_1 \ldots B_{32}$ of the regeneration component.

The memory also has a zeroing connection 24 and a connection 26 carrying control pulses H′ timing the progressive displacement of the signals in the shift register.

FIGS. 4 to 14 illustrate the means required for producing the signals necessary for the supply and control of the circuits of FIGS. 2 and 3. FIGS. 4 to 12 firstly illustrate the elements of the overall circuit and FIGS. 13 and 14 bring together these elements.

The following signals are required for control purposes:

a timing signal which controls the register of the analysis head and various processing signals, a "starting" signal making it possible to start the reading register.

8 signals lasting 4 ms controlling the 8 groups of 32 resistors, a signal controlling the forward movement of the stepping motor, finally and in particular reading signals which constitute the information to be transmitted.

All these signals are advantageously of the TTL level.

It is easy to obtain the timing signal, it being a signal H as shown in part (a) of FIG. 4 and which can be produced by a conventional clock. This clock can control most of the members of the means. However, in the case of the strip of photodiodes it is necessary to have signals such as H′ shown in part (b) of FIG. 4. The obtention of signals H′ from signals H is effected by means of the circuits shown in part (c). This circuit comprises a monostable device 32 and an AND gate 34 with two inputs, one connected to an output $\overline{Q}$ of the monostable device and the other to the clock 30 by means of two NO gates 36.

The arrangement of FIG. 5 is used for switching the supply of the heating resistors for 4 to one of the 8 groups of 32 resistors. This circuit essentially comprises a monostable device 40 with two outputs $Q_1$ and $\overline{Q_1}$ and one input $A_1$. The pulse I of 4 ms is supplied by the output $\overline{Q_1}$. The monostable device 40 starts at the end of an analysis of 32 points if a black point has been detected among the 32 points analysed.

The circuit also comprises two 16 bit binary counters, namely 42 and 44, the assembly constituting a counter by 16×16=256. This counter receives the analysis strip control pulses H′. Counter 44 has an output A on the first binary element or bit (which gives access to a division by 32) and a carry-over or memorizing output R (which corresponds to a division by 256). A starting circuit 46 is connected to the output A of the second counter 44. This circuit transmits a pulse 47 which passes through a NAND gate 56 having three inputs and one output connected to the input $A_1$ of the monostable device 40. A register 48 with parallel inputs and outputs is connected to the outputs of counter 44. This register memorizes the position or rank of the group of 32 points for the duration of pulse I of 4 ms. The coding of this position is effected by 3 bits applied to the inputs a, b and c of the three channel demultiplexer 10 towards 8 connections $A_1 \ldots A_8$ (cf FIG. 2).

Apart from these essential means constituted by monostable device 40, counter 42–44, register 48 and demultiplexer 10, the circuit of FIG. 5 must also have other means ensuring that the 4 ms pulse I obeys the following conditions:

it exists only if a black point is detected (i.e. if a bit 1 appears on the line carrying the analysis signals, it must appear at the end of a group of 32 points, the monostable device 40 for producing the 4 ms pulse must not "see" the other pulses corresponding to the end if the groups of 32 points, the system must be zeroed or reset at the 256th pulse.

If no black point has been detected during the analysis of the line, it is also necessary to control the rotation of the motor and wait a certain time (10 ms for example with conventional motors) for its stabilization before starting the analysis of the following line.

These different conditions can be fulfilled by means of the circuit of FIG. 5 which is completed in the following manner. At NAND gate 52 three inputs receive by a line 50 the analysis signals, by a connection 53 the pulse coming from an "electronic curtain" which will be described hereinafter and by a connection 55 a timing pulse $\overline{70}$. The output of this gate is connected to the input of a monostable circuit 54 having two outputs $Q_2$ and $\overline{Q_2}$ and a zeroing input RAZ. The output $Q_2$ is connected to one of the inputs of the aforementioned NAND gate 56.

In addition, the circuit has two flip-flops 58 and 60, each having a transfer input T receiving the pulses H′. Flip-flop 56 has an input which receives a carry-over pulse 61 transmitted by the output R of the second counter 44 and two outputs Q and $\overline{Q}$, the first connected to the input of flip-flop 60 and the second carrying a pulse 62 which is transferred to the NAND gate 64 which has two inputs and also receives the signal supplied by the output $\overline{Q_2}$ of the monostable device 54. The output of gate 64 supplies a pulse 66 applied on the one hand to the stepping motor (not shown) and on the other to the input $A_2$ of another monostable device 68 with an output $\overline{Q_2}$, which is connected to the zeroing inputs of counters 42 and 44 across a NAND gate 106 and which supplies a timing pulse $\overline{70}$ lasting, for example, 10 ms. This pulse is applied to the third input of gate 52.

In addition, flip-flop 60 supplies at its output Q a pulse 72 which is fed on the one hand to the zeroing input of monostable device 40 and on the other to the zeroing input RAZ of another monostable device 74. The latter has an input $A_1$ and an output $\overline{Q_1}$, which is connected to the third input of the aforementioned gate 56.

Finally, the 4 ms pulse I supplied by monostable device 40 is supplied to a starting circuit 76, which supplies a pulse 78 applied to the input $A_1$ of monostable device 74.

Figure 6:
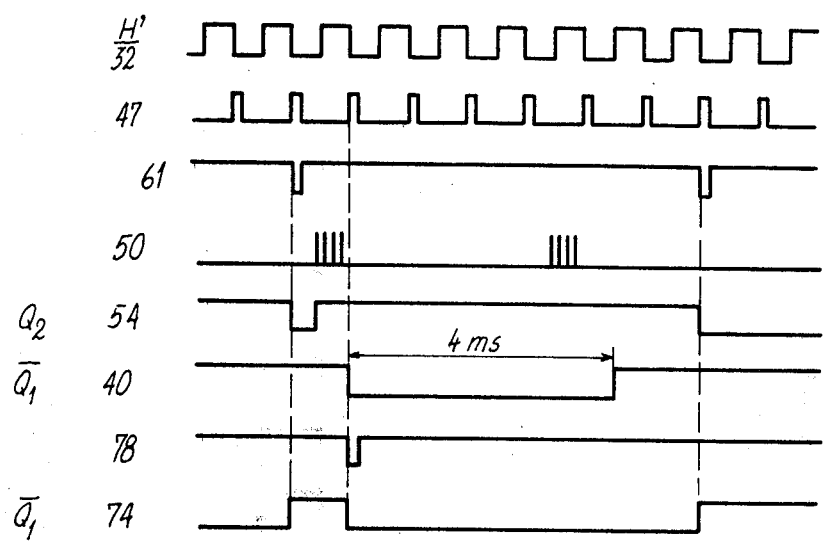
FIG. 6 a chronogram explaining the operation of the aforementioned circuit and the formation of the control signals.
Figure 7:
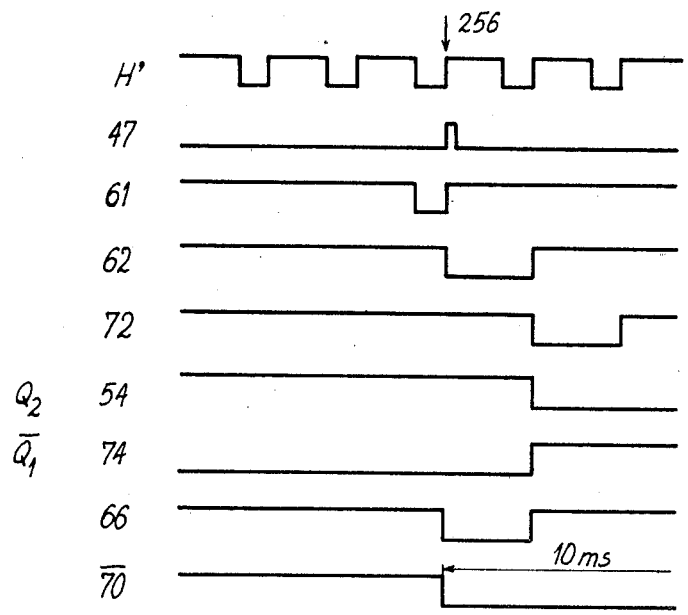
FIG. 7 another chronogram explaining how the circuit of FIG. 5 produces zeroing signals.

The operation of this circuit is described by the chronograms of FIGS. 6 and 7, the first relating to the formation of the 4 ms pulse I and the second to the formation of the control signal of the stepping motor. The left-hand part of the chronogram shows, in front of each line, the reference of the point of the circuit corresponding to the voltage illustrated on said line.

The following additional comments are made. As soon as a pulse appears at the input of line 50 (in other words as soon as a black point has been detected on the redline), monostable device 54 supplies a 1 to one of the inputs of gate 56. The second input of this gate is at 1. Thus, as soon as the pulse 47 corresponding to the end of a group of 32 points arrives, it starts a 4 ms pulse on the outputs $Q_1$ and $\overline{Q_1}$ of monostable device 40. As soon as this pulse appears at $\overline{Q_1}$ pulse 78 switches the monostable device 74 which relocks gate 56. Thus, the monostable device 40 supplying the 4 ms pulses can no longer be re-excited by another pulse 47.

The motor is rotated in the following manner. Pulse 62 corresponds to a carry-over 61 transmitted by counter 44, but displaced by the time of flip-flop 58. Pulse 62 only passes through gate 64 if $\overline{Q_2}$ of monostable device 54 is at 1, which happens if no pulse has reached the input of line 50, i.e. if the line is blank. Moreover, the 10 ms timing pulse necessary for the rotation of the motor is created by monostable device 68 which stops the counting system 42–44 for this time.

Figure 8:
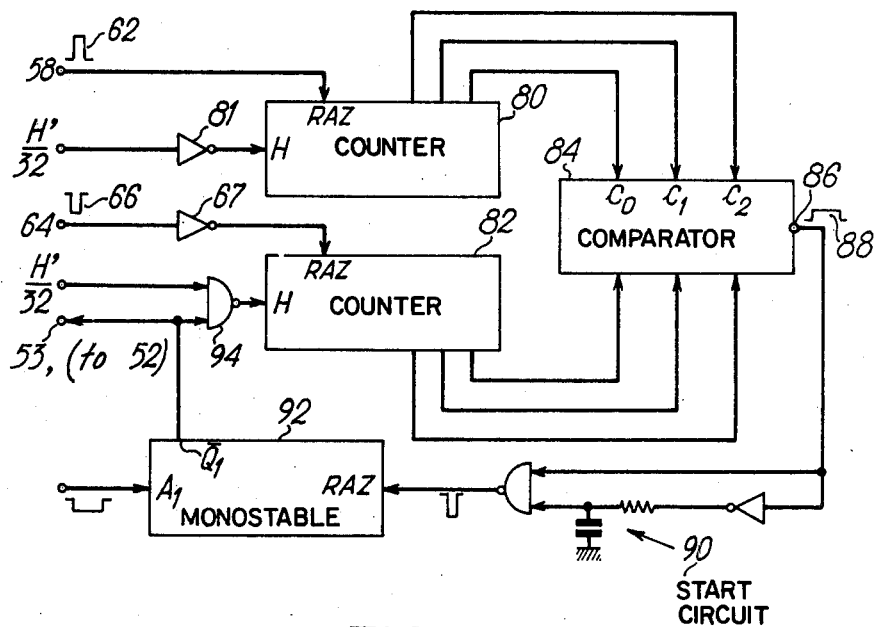
FIG. 8 a block diagram of an "electronic curtain" which can be used in the invention.

FIG. 8 shows the diagram of a circuit serving as an "electronic curtain" and which comprises:

A first counter 80 of capacity 8 which has a clock or timing input H which receives the pulses H'/32 from the output A of the second counter 44 reversed by a NO gate 81. The counter 80 has a zeroing input RAZ which receives the once-displaced carry-over pulse 62 produced by the flip-flop 58 of the circuit of FIG. 5. The counter 80 has three outputs.

A second counter 82 of capacity 8 which has a clock or timing input H, a zeroing input RAZ receiving the control pulse 66 of the motor inverted by reversing gate 67, said pulse coming from gate 64 mentioned with reference to FIG. 5. The second counter also has three outputs.

The comparator 84 with two groups of three inputs connected to three outputs of counters 80 and 82 and with one output 86 which supplies a pulse 88 if the two numbers applied to the inputs of the comparator are the same.

A starting or initiating circuit 90 connected to output 86.

A monostable device 92 with one input $A_1$ which receives the 4 ms pulse I, one output $\overline{Q_1}$ and one zeroing input RAZ connected to the circuit 90. Output $\overline{Q_1}$ is connected by the aforementioned connection 53 to one of the three inputs of gate 52 receiving the analysis signals (cf FIG. 5).

Finally, a NAND gate 94 with two inputs, one receiving the pulses H'/32 from the output A of counter 44 and the other connected to output $\overline{Q_1}$ of monostable device 92.

Figure 9:
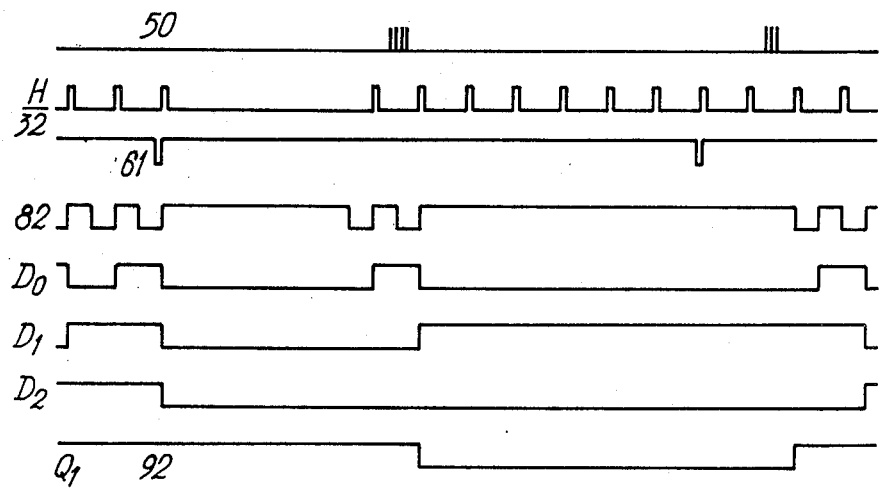
FIG. 9 a chronogram illustrating the operation of the electronic curtain.
Figure 10:
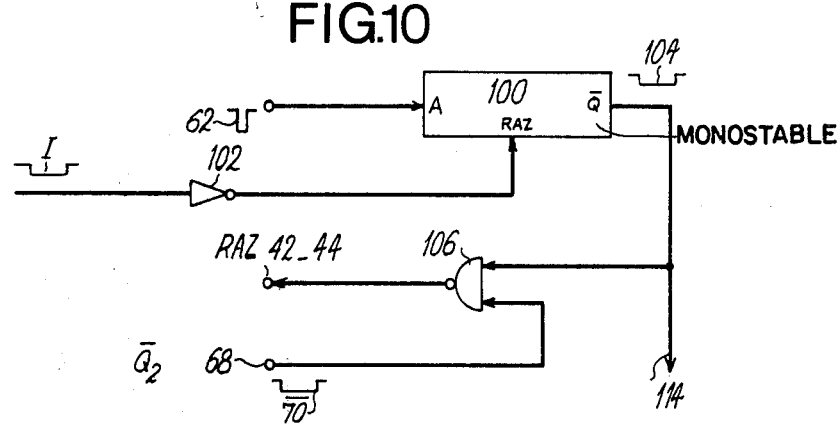
FIG. 10 a block diagram of a zeroing circuit of a main counter.

The operation of this circuit is illustrated by the chronogram of FIG. 9 and the following additional comments are made.

During the first analysis of the line, if black points have been detected in the first area of 32 points, a 4 ms pulse I was detected at the end of the analysis of said first 32 points. The corresponding signals have been transferred to and stored in the memory register maintained operative for the 4 ms necessary for printing the paper.

During the second analysis of the line, it is necessary to mask these first 32 points in order that they are not re-entered in the memory. Moreover, if the second area of 32 points contains no black points, it is necessary to jump or skip it, i.e. not to start the 4 ms pulse at the end of its analysis and instead pass directly to the analysis of the third area. This is the function of the electronic curtain described hereinbefore and which carries this out by means of two binary counters 80 and 82, whose outputs are compared by means of comparator 84. These two counters are synchronously timed, because they are both connected to output A of counter 44, which supplies a pulse for every 32 timing pulses. In other words, counter 80 and 82 advance by one step whenever a group of 32 pulses has been counted. For one of these counters, in the present case counter 82, it is possible to stop the timing pulses if a 4 ms pulse appears by means of monostable device 92. When the outputs of the two counters are again equal, i.e. during the following scan of the same line, the output 86 of the comparator changes state and this change causes the zeroing of monostable device 92 and therefore counter 82 can continue to advance.

The zeroing of counter 80 takes place whenever a line has been analysed, which is obtained by the carry-over pulse 61 of general counter 42–44. The zeroing of counter 82 is effected by the pulse 66 which controls the stepping motor, because at this time it is certain that the complete line has been analysed.

The output $\overline{Q_1}$ of monostable device 92 blocks the line input by closing gate 52 throughout the time when the counter 82 no longer advances and which corresponds to the closing of the "curtain."

A problem remains if the 4 ms pulse exceeds the analysis time of one line, which may occur if a high speed master clock is used or if the last groups of 32 points are analysed. It is then necessary to stop the count with the last group of 32 points until the 4 ms pulse is at an end. It is merely necessary to act on the re-setting of the main counter 42–44 by means of a circuit illustrated in FIG. 10.

The circuit comprises a monostable device 100 with an input A receiving the once-displaced, carry-over pulse (pulse 62 from 58), a zeroing input RAZ receiving the 4 ms pulse I which has previously been reversed by a NO gate 102 and an output $\overline{Q_1}$ supplying a pulse 104 which is fed to the input of a NAND gate 106 which has a second input receiving the pulse $\overline{70}$ transmitted by $\overline{Q_2}$ of 68. The output of gate 106 is connected to the zeroing inputs of counter 42 and 44.

Figure 11:
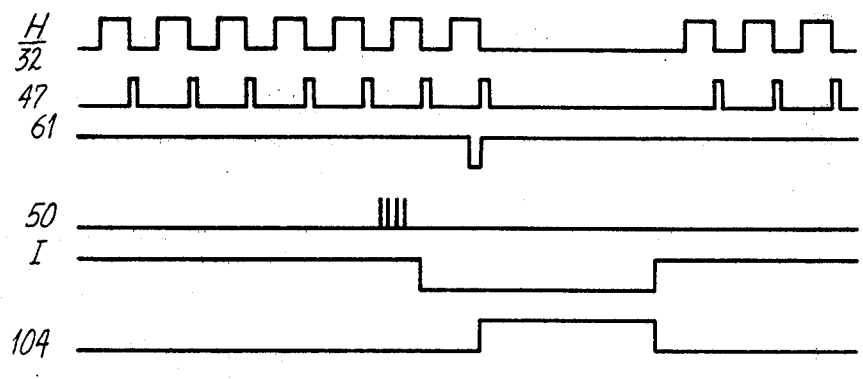
FIG. 11 a chronogram illustrating the operation of the aforementioned circuit.

The operation of this circuit is described by the chronogram of FIG. 11. At the end of the 256th pulse, if the 4 ms pulse I is still present, the carry-over pulse 62 of general counter 42–44 acts on the monostable device 100, whose output supplies pulse 104 to gate 106, which brings about the zeroing of the main counter. The 10 ms timing pulse 70 acts on the same counter across the same gate.

This leaves the problem of forming the signal for the start of analysis of a line and this signal must appear after the 10 ms motor rotation pulse, at the time of the 256th pulse if the 4 ms pulse is this side of the 256th pulse and after the 4 ms pulse I if the latter exceeds the 256th pulse.

Figure 12:
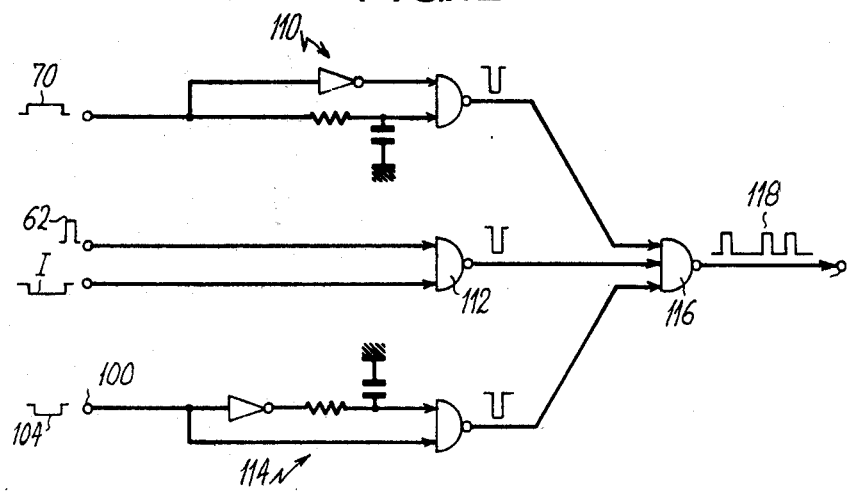
FIG. 12 a circuit diagram of the formation of a signal for starting the reading of a line.

The circuit of FIG. 12 makes it possible to produce a starting signal which is in acccordance with these requirements. The circuit comprises a starting or initiating circuit 110 which receives the 10 ms pulse 70, a NAND gate 112 with two inputs, one receiving the once-displaced, carry-over pulse 62 and the other the 4 ms pulse I, a second starting or initiating circuit 114 receiving the pulse 104 supplied by monostable device 100. The three circuits 110, 112 and 114 are connected to three inputs of a NAND gate 116, which supplies the start of analysis pulses 118.

Figure 13:
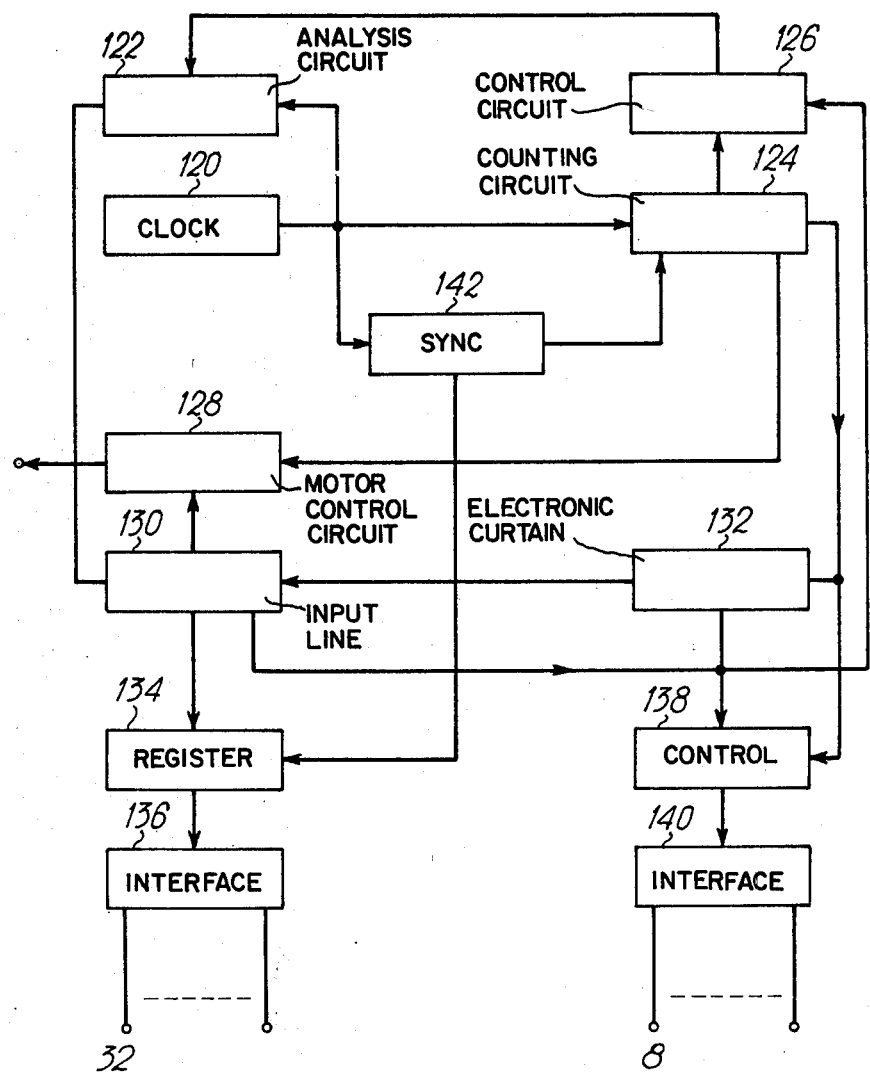
FIG. 13 a block diagram of the overall circuit of the invention.

The elements of the device have been successively described and FIGS. 13 and 14 now illustrate the way in which they cooperate for forming the complete apparatus.

FIG. 13 firstly gives the block diagram of the apparatus indicating the main functional blocks: a timing or clock circuit 120, an analysis means 122, a counting circuit 124, a start of analysis control circuit 126, a motor control circuit 128, a line input 130, an electronic curtain 132, a 32 bit register 134, an interface 136, a circuit 138 for controlling the 8 common terminals, an interface 140 and finally a synchronization circuit 142.

FIG. 14 shows the circuit elements of FIGS. 2, 3 5, 8, 10 and 12 and shows the interconnections between these circuits, the reference being the same as in the following drawings.

What is claimed is:

1. A blank jumping teleprinter comprising:
   a means for reading a document line by line, each line having N points and being read point by point, said means delivering for each point a reading signal;
   a means for controlling said reading means so that each line is read the same number of times as the reading means supplies groups of P reading signals incorporating at least one non-zero signal, P being a submultiple of N;
   an electronic curtain placed after said means for reading, said electronic curtain permitting the passage of each group containing at least one non-zero signal at each reading of the line;
   a memory connected to the electronic curtain, said memory having P cells successively receiving the P reading signals belonging to a group of P reading signals containing at least one non-zero signal;
   a demultiplexer connected to said memory; and
   a writing means connected to said demultiplexer, said writing means having N writing points organized in groups of P points, said demultiplexer making it possible to address the contents of the P cells of the memory to the group of the writing means corresponding to the group of read points.

2. An electronic device according to claim 1, wherein the electronic curtain is constituted by two binary counters having one input and a group of outputs, a comparator having two inputs connected to the two groups of outputs of the counters, a circuit inhibiting the input of one of the counters and incorporating a monostable device having a zeroing input connected to the output of the comparator and at output connected to a logic NAND gate, which has an output connected to the input of the said counter.

3. A teleprinter according to claim 1, wherein it comprises a general counter having a capacity equal to the number of analysis points of one line, a carry-over output and a division by P outputs, said counter being connected to a memory with parallel inputs and outputs which is connected to a demultiplexer having the same number of outputs as the writing means has groups of P writing points.

4. A teleprinter according to claim 1, wherein it comprises an input circuit for the analysis signals constituted by a logic NAND gate with three inputs, the first connected to the reading means, the second connected to the output of the monostable device of the electronic curtain and the third connected to a circuit for forming a timing pulse at the end of a line.

5. A teleprinter according to claim 4 further comprising:
   a monostable device having an input connected to the demultiplexer and a control input, a NAND gate with one output connected to the monostable device and three inputs, the first connected to a further monostable device, whose input is connected to the logic NAND gate of claim 5, the second to yet a further monostable device having a zeroing input connected across two flip-flops to the carry-over output of the general counter and the third to a starting circuit connected to an output of the general counter.

* * * * *